A. HELDRICH.
KEY CUTTING MACHINE.
APPLICATION FILED JAN. 10, 1916.
1,218,653.
Patented Mar. 13, 1917.
5 SHEETS—SHEET 3.
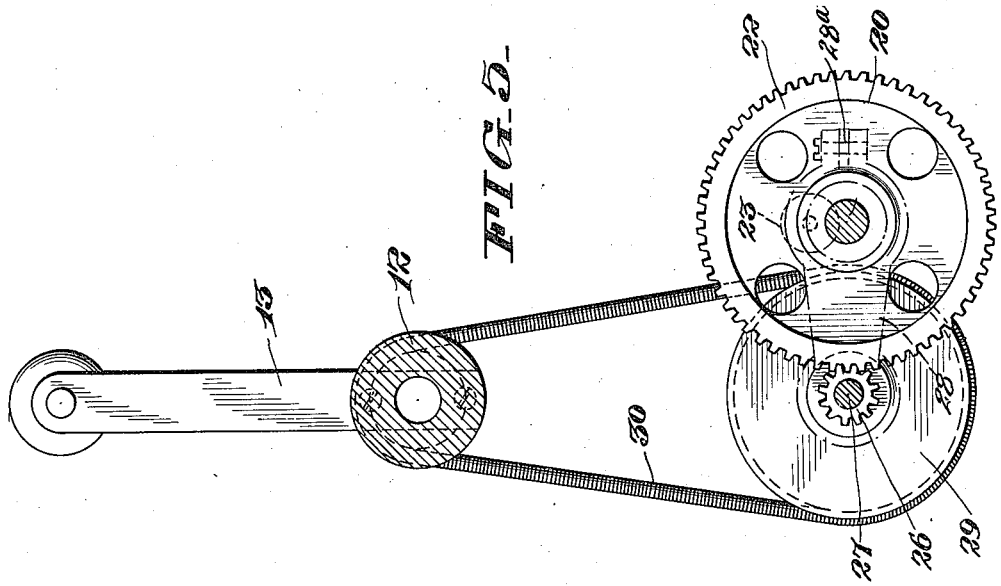
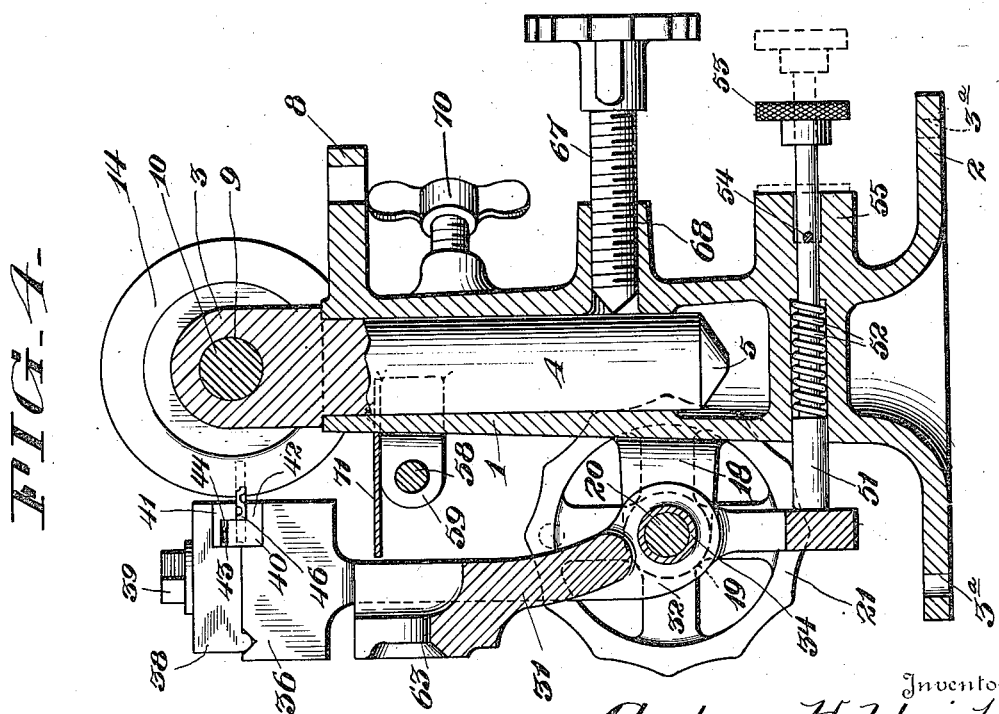
Witnesses
Wm. Conway.
C. R. Ziegler.
Inventor
Andrew Heldrich,
By Joshua R. H. Potts.
His Attorney

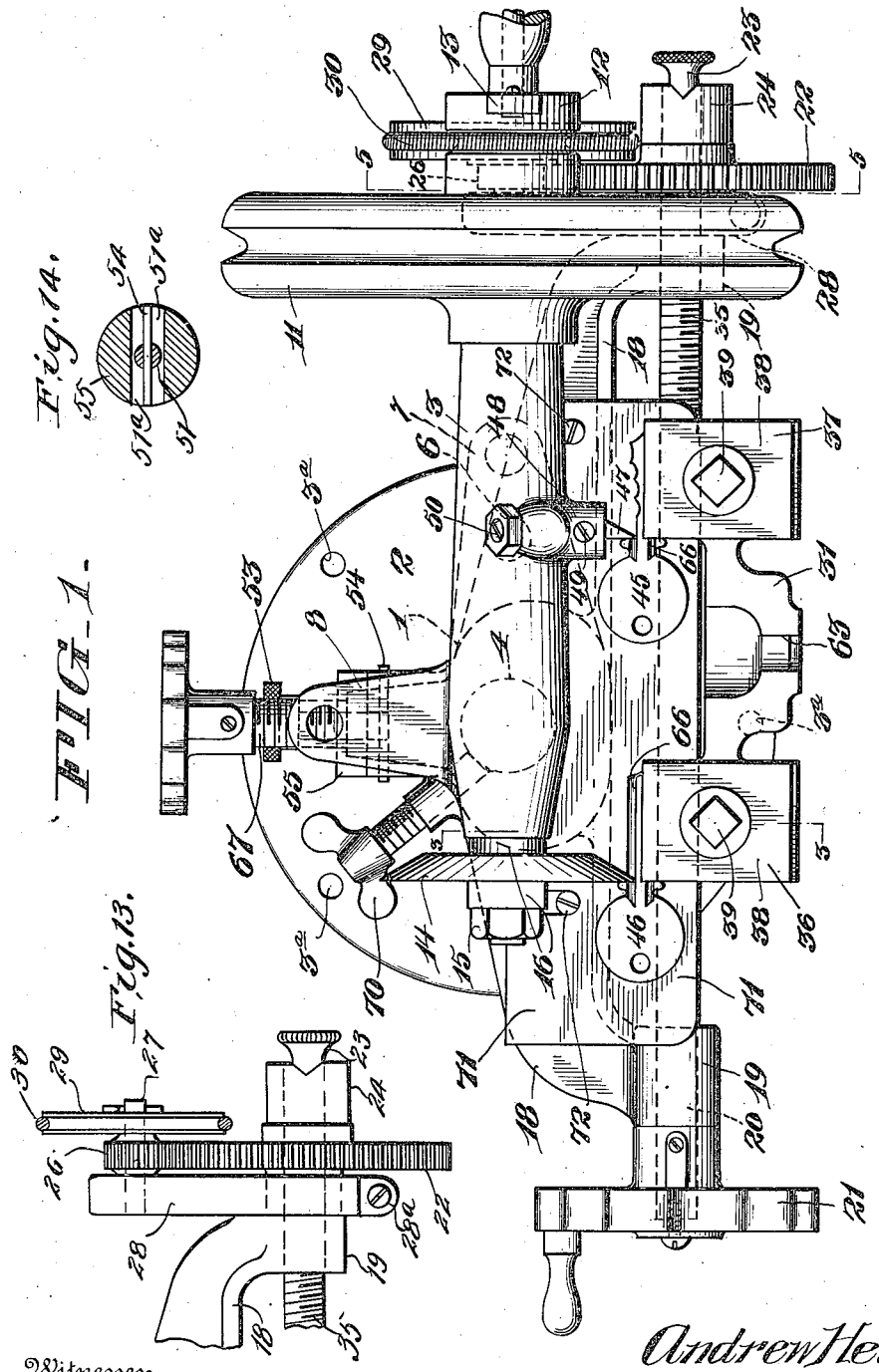

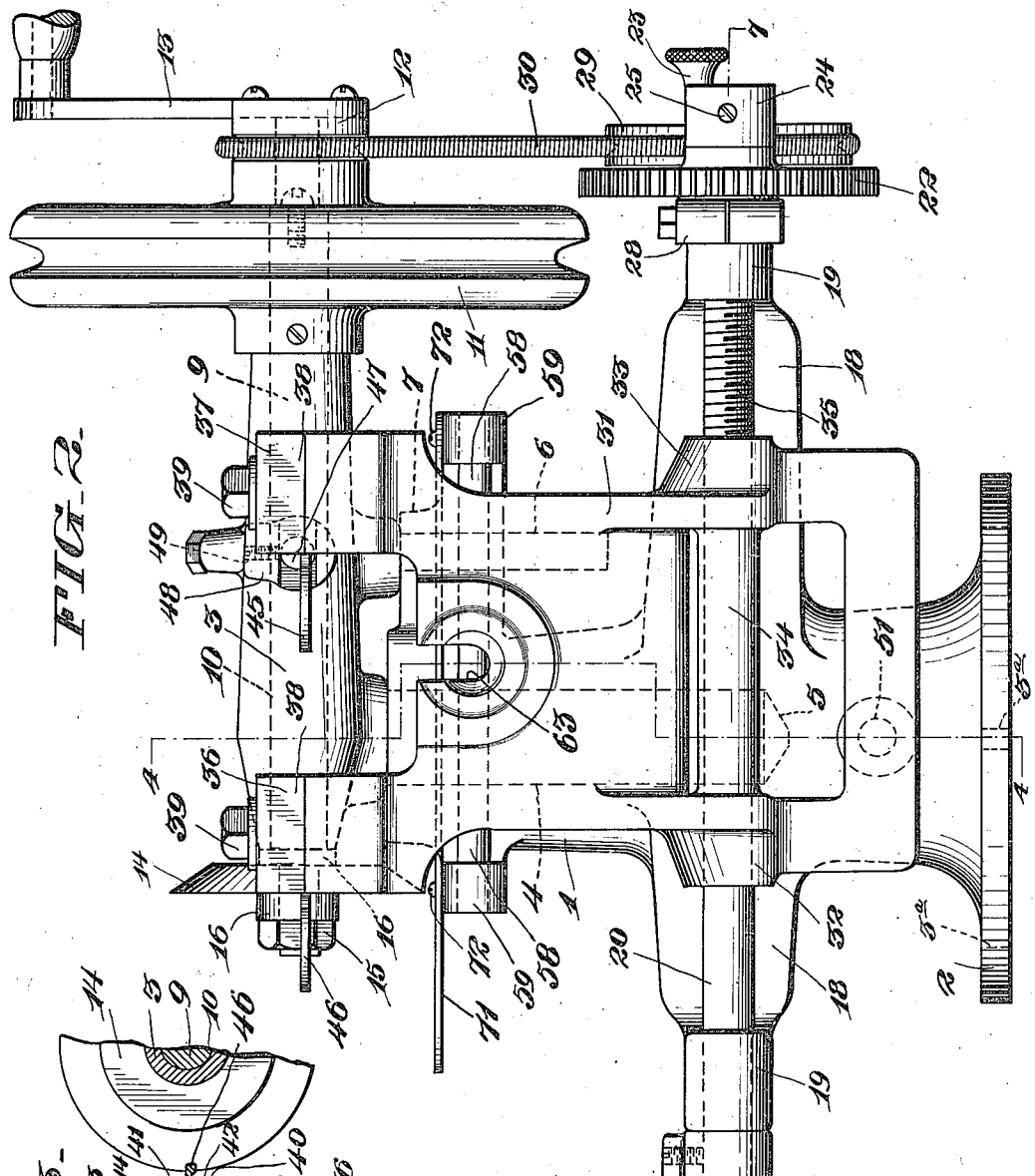

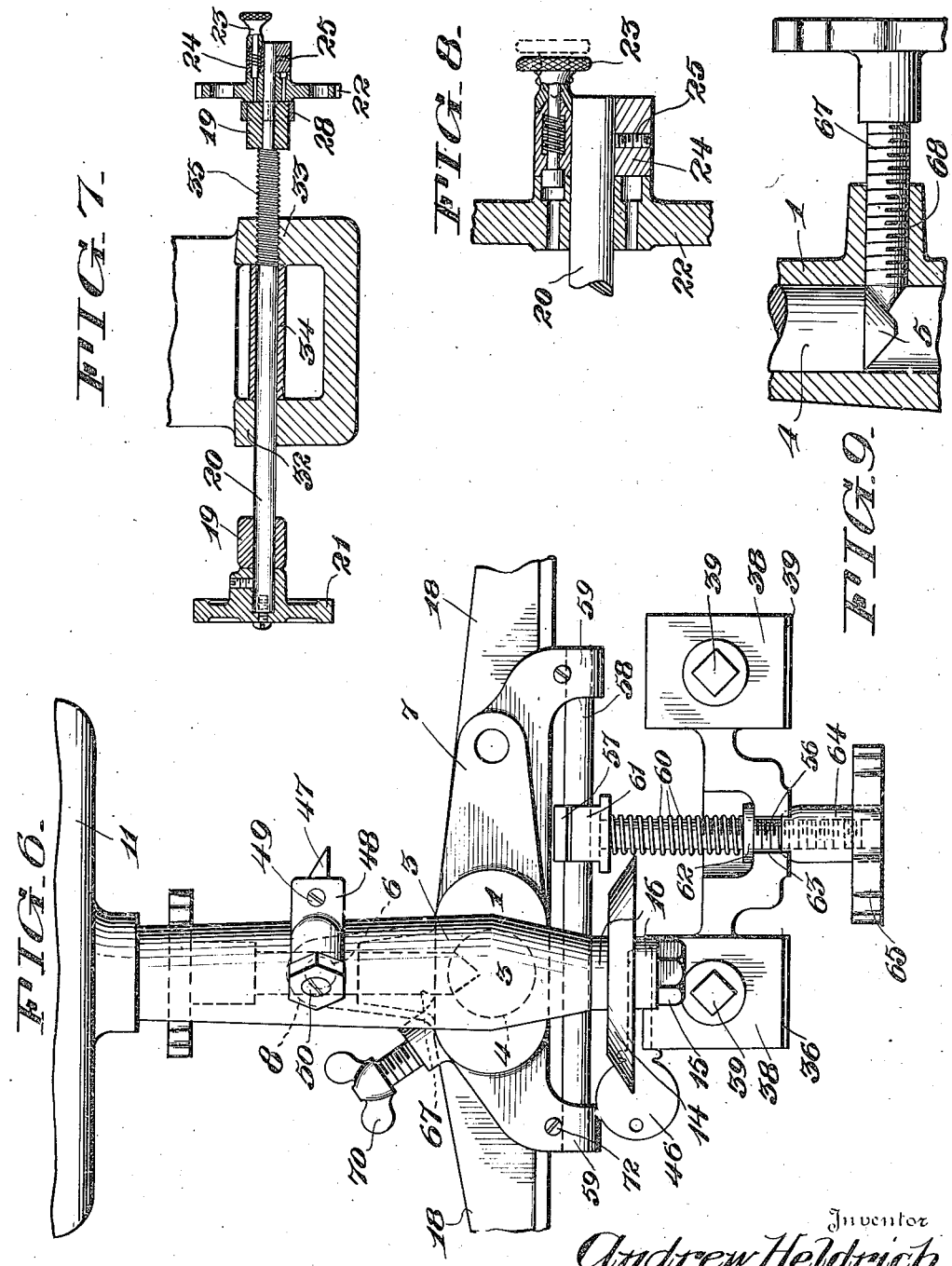

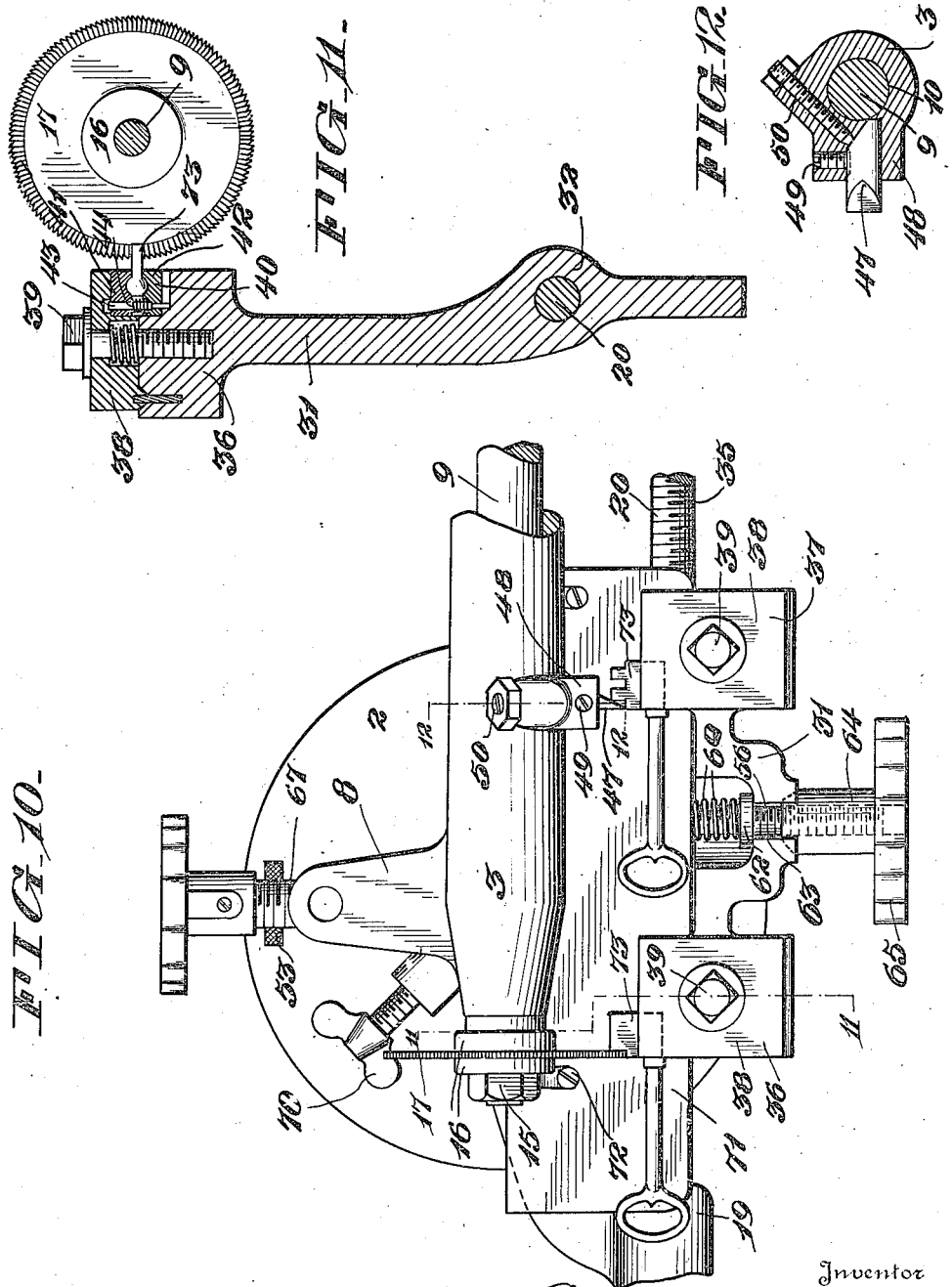

UNITED STATES PATENT OFFICE.

ANDREW HELDRICH, OF PHILADELPHIA, PENNSYLVANIA, ASSIGNOR TO PHILIP KOVSKY, OF PHILADELPHIA, PENNSYLVANIA.

KEY-CUTTING MACHINE.

1,218,653.   Specification of Letters Patent.   Patented Mar. 13, 1917.

Application filed January 10, 1916. Serial No. 71,267.

*To all whom it may concern:*

Be it known that I, ANDREW HELDRICH, a citizen of the United States, residing at Philadelphia, in the county of Philadelphia and State of Pennsylvania, have invented certain new and useful Improvements in Key-Cutting Machines, of which the following is a specification.

My invention relates to improvements in key cutting machines, the object of the invention being to provide a key cutting machine which is capable of cutting keys of various forms, and which insures accurate cutting in accordance with the master key.

A further object is to provide a key cutting machine which automatically guides the cutting of a blank by the engagement of a pilot pin with a master key, and controls the feeding of the mechanism so as to insure an exact duplication of the master key.

A further object is to provide a key cutting machine in which a spindle supporting head is provided carrying a cutting tool and capable of movement at different angular positions so as to permit the cutting of grooves longitudinally of the keys as well as recesses in the edges of the keys.

A further object is to provide improved means for adjusting the position of the head to vary the depth of the grooves cut in the keys, and provide improved means for feeding the keys toward and away from the cutter, together with improved means for feeding the keys at right angles to the cutter.

A further object is to provide a key cutting machine with an improved arrangement of key clamping chucks secured in improved vises supported on a frame movable toward and away from the cutter and at right angles to the cutter.

A further object is to provide a key cutting machine with improved power transmission mechanism, whereby the parts are compelled to operate in unison to produce the desired results.

A further object is to provide a machine of the character stated with attachments which increase the efficiency of the machine, and give to the same a wide range of action in the cutting of various kinds of keys.

With these and other objects in view, the invention consists in certain novel features of construction and combinations and arrangements of parts as will be more fully hereinafter described and pointed out in the claims.

In the accompanying drawings:

Figure 1 is a top plan view illustrating my improved key cutting machine.

Fig. 2 is a view in front elevation.

Fig. 3 is a fragmentary view in section on the line 3—3 of Fig. 1.

Fig. 4 is a view in vertical section on the staggered line 4—4 of Fig. 2.

Fig. 5 is a view in section on the line 5—5 of Fig. 1.

Fig. 6 is a fragmentary plan view illustrating the head of the machine turned at right angles to the position shown in Figs. 1, 2, and 4, and in position to cut longitudinal grooves in the key.

Fig. 7 is a view in horizontal section on a reduced scale, the view being taken on the line 7—7 of Fig. 2.

Fig. 8 is an enlarged view in section similar to the right hand end of Fig. 7 to illustrate more clearly the means for locking the gear wheel to the feed screw.

Fig. 9 is a fragmentary view in vertical section through the standard 1, illustrating the means for adjusting the vertical position of the head 3 when the latter is in position to cut grooves in the key.

Fig. 10 is a fragmentary top plan view illustrating my improvements arranged for cutting angular recesses in the key, and in which form I show a rotary side and edge cut saw as distinguished from a file or beveled cutter used for the keys of pin locks.

Fig. 11 is a view in section on the staggered line 11—11 of Fig. 10.

Fig. 12 is a view in section on the line 12—12 of Fig. 10.

Fig. 13 is a fragmentary plan view showing certain of the elements of my invention, and Fig. 14 is a cross section through the tubular extension 55 showing the grooves therein.

1 represents a relatively heavy hollow metal standard, having an integral base 2 adapted to be secured in any approved manner to a support, and I have shown holes 3$^a$ in the base for the reception of screws (not shown) to secure the same in place.

3 represents a movable head which is supported on the upper end of standard 1, and provided adjacent one end with a depending relatively large pin 4, the latter fitting within the hollow standard 1, and provided with a beveled lower end 5 for a purpose which will hereinafter appear.

A second relatively small pin 6 is fixed to the head 3, projects downwardly from the latter, parallel to pin 4, and may be projected after the head is raised and turned on the large pin 4, through either of two perforated ears 7 and 8, integral with standard 1, and located at right angles to each other.

Head 3 has a longitudinal bearing 9 in which a spindle 10 is mounted to turn, and is provided on one end with a pulley 11 which may be driven from any suitable source of power (not shown).

Pulley 11 is provided with an integral concentric small hub pulley 12, to which a crank arm 13 is secured, and this crank arm is to be manually operated to turn the spindle as will be understood.

On the other end of the spindle 10, a cutter 14 is secured by means of a nut 15 screwed onto the threaded end of the spindle, and clamping the cutter between washers 16. The cutter 14, shown in Figs. 1, 2, 3, 4, and 6, of the beveled type, is for use in cutting keys for pin locks, while in Figs. 10, and 11, I illustrate a cutter 17 which is in the form of a saw, and is adapted for cutting straight notches and grooves in keys of other type.

Standard 1 is provided with laterally projecting integral arms 18, having bearings 19 at their free ends supporting a feed screw 20, the latter being held against longitudinal movement, yet free to turn in the bearings 19.

A crank wheel 21 adapted to be manually operated, is secured to one end of the feed screw 20, and a gear wheel 22 is loose on the other end of the feed screw and is connected to the feed screw by means of a spring-pressed clutch pin 23 carried by a collar 24 fixed to the feed screw 20 by means of a screw 25.

The gear 22 meshes with a pinion 26 turning on a stub shaft 27, and said stub shaft constitutes a fixed part of a split clamp 28 secured around one of the bearings 19 by adjusting screws 28ª.

A pulley 29 is made integral with or fixed to turn with pinion 26, and is connected by an endless belt 30 with the hub pulley 12, so that motion is transmitted from the spindle 10 to the feed screw 20, through the medium of the mechanism above described.

The clamp 28 can be adjusted on the bearing 19 to take up slack in the belt 30, and prevent lost motion by loosening the screw 28ª and lowering the end of the clamp which supports the pinion 26 and the pulley 29.

A key supporting frame 31 is supported on feed screw 20, and is provided near its lower end with bearings 32 and 33, and with a spacing sleeve 34 between the bearings. The feed screw 20 extends through the bearings 32 and 33, and through the sleeve 34, but it will be noted that the screw 20 has threads 35 throughout a portion of its length only, and these screws engage internal threads in the bearing 33, the bearing 32 and sleeve 34 being smooth and sliding freely on the screw, yet the frame is compelled to move longitudinally of the screw by reason of the engagement of the threads in bearing 33 with the threads 35 of the screw.

On the upper end of the frame 31, two vises 36 and 37 are provided. These vises are precisely alike in construction, and each vise has an upwardly spring-pressed head 38 moved downwardly by a screw 39 to clamp a key chuck 40 in the vise.

The key chucks 40 are made of sizes and shapes to fit the different styles of keys, and they each comprise two members 41 and 42, one of which is movable on pins 43 having coiled springs 44 thereon, tending to separate the members of the chuck, but allowing members of the chuck to be compressed by the vise to securely clamp the key.

The vise 37 is for the master key 45, while the vise 36 is for the blank key 46 to be cut. A pilot pin 47 is supported in a tubular extension 48 on head 3, and is adjusted by means of screws 49 and 50 so as to position its outer end in exact alinement with the edge of the cutter 14.

A plunger 51 has fixed to it a transverse pin 54 normally movable within grooves 51ª in the standard 1. The plunger extends transversely through the standard 1, and is pressed in one direction by a coiled spring 52, so that it exerts a continual pressure against the frame 31 below feed screw 20, so that the plunger operates to press the upper end of the frame carrying two vises 36 and 37 toward the head 3.

When this pressure of plunger 51 is not desired, the plunger can be drawn outwardly by means of a milled head 53, and turned at right angles to position the pin 54 against a tubular extension 55 on standard 1, and hold the spring contracted and the plunger out of the path of the frame 31 as indicated. This withdrawn position of the plunger is indicated by dotted lines in Fig. 4.

When cutting keys for pin locks, the spring pressure of the plunger on the frame 31 is desired as it operates to hold the master key 45 against pilot pin 47, and guides the cutting action of cutter 14 into the key blank 46.

It is to be understood that during the cutting action, the frame 31 is moved longitudinally of the head 3 by means of the feed screw 20, so that the blank key 46 is cut an exact duplicate of the master key 45. When cutting other forms of keys, such as shown in Figs. 10 and 11, the saw 17 is substituted for the cutter 14.

When it is desired to manually feed the upper end of the frame with its vises 36 and 37 toward and away from the frame, an attachment such as shown clearly in Fig. 6 is employed. This attachment comprises a bolt 56 having a hook 57 at one end, positioned around a rod 58 which is secured in arms 59 integral with standard 1.

A coiled spring 60 on the bolt 56 presses a block 61 against the rod 58 and prevents accidental removal of the hook 57, and at its other end presses a washer 62 against the frame 31.

Bolt 56 projects through a recess 63 in the upper end of frame 31, and is provided on its outer end with a nut 64 having a hand wheel 65 thereon to facilitate a quick adjustment on the bolt and move the upper end of the frame toward and away from the head 3.

The form of attachment shown in Fig. 6 is especially desirable when the cutter is used for cutting the longitudinal grooves 66 in the key, and is also used when cutting straight notches and recesses in the key such as shown in Figs. 10 and 11. It is only with the keys for pin locks that it is desirable to have an automatic longitudinal feed by means of the feed screw 20, but with other kinds of keys it is necessary to manually control the movement of the key in order to form the various shapes of notches and grooves, and the automatic feed cannot be relied upon.

In cutting longitudinal grooves in the keys, the head 3 is turned at right angles to its normal position, as shown in Fig. 6, and the pin 6 is supported in the perforated ear 8. When in this position, it is desirable especially for controlling the depth of groove cutting to adjust the head vertically. For this reason, the lower end of the pin 4 is made tapering or conical, and is engaged by the conical or pointed end of a set screw 67 which projects through an internally screw-threaded tubular extension 68 on standard 1, and bears at its inner end against the conical lower end 5 of pin 4.

By adjusting the screw 67 inwardly and outwardly a certain amount of vertical adjustment is permitted the head 3 so as to nicely control the depth of cutting of the cutter 14.

A jam screw 70 is provided in the standard 1, and at its inner end bears against the pin 4, so as to clamp the latter against accidental vertical movement after the proper vertical adjustment is had.

To protect the parts from filings, I preferably locate a shield 71 on the arms 59, and below the cutter 14, and preferably secure this shield by means of screws 72 which permit its removal whenever desired.

It will be noted that with my improved machine the master key 45 by reason of its engagement with the pilot pin 47, controls the relative positions of the cutter 14 and the blank key 46, so that the blank key must be cut exactly like the master key.

When cutting keys for pin locks, the keys are secured in the vises 36 and 37 with the front shoulders of the keys against the cutter and the pilot pin respectively, it being understood of course that the master key is against the pilot pin and the blank against the cutter. When the keys are thus positioned, and power is imparted to the spindle 10, the cutter 14 will be revolved and frame 31 will be moved longitudinally of the head 3, and spring pressure will be maintained upon the frame by reason of the spring plunger 51, so that the blank will be cut exactly like the master key.

In cutting other forms of keys, such as shown at 73 in Fig. 10, a saw cutter 17 is used, and the movement of the frame 31 must be controlled manually by means of the hand wheel 65 to move the frame 31 inwardly and outwardly, and by means of the crank wheel 21 to move the frame longitudinally of the head.

When cutting this form of key, such as shown in Fig. 10, the master key at the right by reason of its engagement with the pilot pin, will guide the operation of the cutter, and compel the blank to be cut exactly like the master key.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A key cutting machine, comprising a support, a head thereon, a rotary cutter on the head, a frame having two vises thereon, one vise for a master key and the other for a blank, and a pilot engaging the master key and controlling the engagement of the blank key by the cutter, said head being movable to change the cutting angle of said cutter with respect to the blank, and means for securing the head to the support, substantially as described.

2. The combination in a key cutting machine, of a standard, a cutter carried by said standard, a frame pivoted on said standard and having upwardly and downwardly projecting arms, a vise supported by the upwardly extending arm, a plunger slidably mounted in said standard, and resilient means for moving said plunger toward and directly into contact with the downwardly projecting arm thereby moving said vise toward the cutter, substantially as described.

3. The combination in a key cutting machine, of a standard, a cutter carried by said standard, a frame pivoted on said standard and having upwardly and downwardly projecting arms, a vise supported by the upwardly extending arm, a plunger slidably mounted in said standard, a spring in said standard designed to move said plunger toward and directly into contact with the downwardly projecting arm of the frame whereby the vise is moved toward the cutter, substantially as described.

4. The combination in a key cutting machine, of a standard, a cutter carried by said standard, a frame pivoted on said standard and having upwardly and downwardly projecting arms, a vise supported by the upwardly extending arm, a plunger slidably mounted in said standard, a spring in said standard designed to move said plunger into contact with the downwardly projecting arm of the frame whereby the vise is moved toward the cutter, a stem on said plunger, a pin extending transversely through the stem, said standard having grooves to normally allow the pin to slide therein, a handle on said stem for retracting the plunger, said plunger and stem being designed to be rotated to change the position of said pin to permit the latter to engage said standard and hold the plunger out of engagement with said depending arm of the frame, substantially as described.

5. In a key cutting machine, the combination with a standard, of a head supported on the standard, a horizontal spindle in the head having a cutter on one end, and means on the other end for turning the spindle, a frame pivotally connected to the standard, two vises on the frame, one for a master key and the other for a blank, and a pilot pin on the head adapted to be engaged by the master key and guide the blank against the cutter, said head being movable to change the cutting angle of said cutter with respect to the blank, and means for securing the head to the standard, substantially as described.

6. The combination in a key cutting machine, of a standard, a head pivotally mounted in the standard, a frame, vises thereon, means for moving the vises in a pre-determined path, a spindle in said head, a cutter on said spindle for cutting a key-blank held in one of said vises, a pilot pin carried by said head and designed to engage a master key carried by the other of said vises, and means for securing said head in different pivotal positions to present the cutter substantially at right angles and parallel with the path of movement of said vise-moving means, substantially as described.

7. The combination in a key cutting machine, of a standard, a head pivotally mounted in the standard, a frame, vises thereon, means for moving the vises in a pre-determined direction, a spindle in said head, a cutter on said spindle for cutting a key-blank held in one of said vises, a pilot pin carried by said head and designed to engage a master key carried by the other of said vises, said standard and head having portions for engagement with each other whereby said cutter can be adjusted about its pivot and locked in its adjusted position so that its cutting edge can engage the key-blank at different angles, substantially as described.

8. The combination in a key cutting machine, of a standard, a head pivotally mounted in the standard, a frame, vises thereon, means for moving the vises in a pre-determined direction, a spindle in said head, a cutter on said spindle for cutting a key-blank held in one of said vises, a pilot pin carried by said head and designed to engage a master key carried by the other of said vises, ears formed on said standard and each having a perforation, and a pin on said head designed to enter either of said perforations whereby said cutter can be adjusted about its pivot and locked in its adjusted position so that its cutting edge can engage the key-blank at different angles, substantially as described.

9. The combination in a key cutting machine, of a standard, a movable head, a recess in said standard, a pin on said head pivotally mounted within said recess, a frame, means for moving said frame in a pre-determined path, vises carried by said frame, and for respectively holding a key-blank and a master key, a pilot pin carried by said head for engagement with the pilot key, a cutter carried by said head and for cutting said key-blank, and means for securing the head in different pivotal positions whereby the cutting edge of said cutter can engage the key-blank at different angles, substantially as described.

10. In a key cutting machine, the combination with a hollow standard, of a head supported on the standard and having a pin projecting into the standard, said pin having a beveled lower end, a set screw in the standard engaging the lower end of the pin to adjust the head vertically, a spindle in the head, a cutter on the spindle, a frame supported on the standard, two vises on the frame, one for a master key and the other for a blank to engage the cutter, and a pilot pin on the head to engage the master key and control the engagement of the blank by the cutter, substantially as described.

11. In a key cutting machine, the combination with a hollow standard, of a head supported on the standard and having a pin projecting into the standard, said pin having a beveled lower end, a set screw in the standard engaging the lower end of the pin to adjust the head vertically, a spindle in the head, a cutter on the spindle, a frame supported on the standard, two vises on the frame, one for a master key and the other for a blank to engage the cutter, a pilot pin on the head to engage the master key and control the engagement of the blank by the cutter, a pair of perforated ears on the standard at right angles to each other, and a second pin on the head adapted to be positioned in either of said perforated ears to hold the head at different angles relative to the frame, substantially as described.

12. The combination with a standard having laterally projecting arms thereon, of a horizontal feed screw supported in the arms, a frame pivotally mounted on the feed screw and having screw-threaded engagement with the feed screw, a head pivotally supported on the standard, a horizontal spindle, means permitting the adjustment of the cutter in a horizontal plane, in the head, a cutter on the spindle, two vises on the upper end of the frame, one vise for a master key and the other for a blank, a pilot pin on the head engaging the master key, and means on one end of the feed screw for manually turning the same to move the frame at right angles to the cutter, and means for securing the head to the standard at different pre-determined positions to change the cutting angle of said cutter with respect to the blank, substantially as described.

13. The combination with a standard having laterally projecting arms thereon, of a horizontal feed screw supported in the arms, a frame pivotally mounted on the feed screw and having screw-threaded engagement with the feed screw, a head supported on the standard, a horizontal spindle in the head, a cutter on the spindle, two vises on the upper end of the frame, one vise for a master key and the other for a blank, a pilot pin on the head engaging the master key, a clamp secured to one of said arms and having a stub shaft at its free end, a pinion on the stub shaft, a pulley fixed to turn with the pinion, a pulley on the spindle, a belt connecting the two pulleys, a gear loose on the feed screw and meshing with the pinion, a collar fixed to the feed screw, and a clutch pin on the collar adapted to engage the gear wheel, whereby the latter may be released and the feed screw independently turned to move the frame, substantially as described.

14. In a key cutting machine, the combination with a standard, of a head pivoted on the standard, a rotary cutter supported by the head, means permitting the adjustment of the cutter in a horizontal plane, a frame pivotally connected to the standard, means for moving the frame at right angles to the cutter, means for moving the frame toward and away from the cutter, a pair of vises on the upper end of the frame key holding chucks in said vises, a pilot pin on the head adapted to be engaged by the master key in one of the vises to control the movement of the frame relative to the cutter, and thereby control the movement of a blank key in the other of said vises, so that it will be cut exactly like the master key, and means for securing the head to the standard in different positions to change the cutting angle of the cutter with respect to the blank key, substantially as described.

15. The combination of a standard, a head, means for pivoting the head on the standard and permitting said head to pivot, means for adjusting said first means into different positions in a direction transversely to the direction of the pivotal movement, a cutter on said head, key-holding means, and means for moving said key-holding means toward the cutter, substantially as described.

16. The combination with a frame having openings, of two vises on the frame, one adapted to receive a master key and the other a blank, a head, a spindle in the head having a cutter on one end adapted to engage the blank key, said head being pivoted on the frame and having a portion designed to enter said openings to change the position of the cutter relatively to the blank, a pilot pin on the head adapted to engage the master key, spring-pressed means operative directly against the frame for forcing it toward the head, and means for moving the frame at right angles to the cutter, substantially as described.

17. The combination in a key cutting machine, of a standard, a frame mounted thereon, vises carried by said frame for respectively holding a key-blank and a master key, a cylindrical opening in said standard, a head having a cylindrical pin fitting said opening, and permitting a pivot movement of said head, a cutter carried by said head for cutting the key-blank, a pilot pin on said head for engagement with the master key, means for traversing the said frame, ears on said standard each having a perforation, and arranged at an angle to each other, a pin secured to said head, said latter pin being shorter than said first cylindrical pin whereby the head may be vertically moved to free said second mentioned pin from the perforations without the said first pin entirely leaving its opening, substantially as described.

18. The combination in a key cutting machine, of a standard, a frame mounted thereon, vises carried by said frame for respectively holding a key-blank and a master key, a cylindrical opening in said standard, a head having a cylindrical pin fitting said opening, and permitting a pivot movement of said head, a cutter carried by said head for cutting the key-blank, a pilot pin on said head for engagement with the master key, means for traversing the said frame, ears on said standard each having a perforation, and arranged at an angle to each other, a pin secured to said head, said latter pin being shorter than said first cylindrical pin whereby the head may be vertically moved to free said second mentioned pin from the perforations without the said first pin entirely leaving its opening, and means for engagement with said cylindrical pin for adjusting the height of the cutter, substantially as described.

19. The combination in a key cutting machine, of a standard, a frame mounted thereon, vises carried by said frame for respectively holding a key-blank and a master key, a cylindrical opening in said standard, a head having a cylindrical pin fitting said opening, and permitting a pivot movement of said head, a cutter carried by said head for cutting the key-blank, a pilot pin on said head for engagement with the master key, means for traversing the said frame, ears on said standard each having a perforation and arranged at an angle to each other, a pin secured to said head, said latter pin being shorter than said first cylindrical pin whereby the head may be vertically moved to free said second mentioned pin from the perforations without the said first pin entirely leaving its opening, means for engagement with said cylindrical pin for adjusting the height of the cutter, and means for rigidly securing the said cylindrical pin to the standard, substantially as described.

In testimony whereof I have signed my name to this specification in the presence of two subscribing witnesses.

ANDREW HELDRICH.

Witnesses:
 CHAS. E. POTTS,
 M. B. CATTELL.